(12) United States Patent
Chen et al.

(10) Patent No.: US 8,233,100 B2
(45) Date of Patent: Jul. 31, 2012

(54) SHARED LIGHT SOURCE IN AN ELECTRONIC DEVICE

(75) Inventors: Chi-Wei Chen, Hsin-Chu (TW); Hai-En Tsai, Hsin-Chu (TW)

(73) Assignee: Au Optronics Corporation (TW)

( * ) Notice: Subject to any disclaimer, the term of this patent is extended or adjusted under 35 U.S.C. 154(b) by 1209 days.

(21) Appl. No.: 12/012,498

(22) Filed: Feb. 1, 2008

(65) Prior Publication Data

US 2009/0195713 A1 Aug. 6, 2009

(51) Int. Cl.
*G02F 1/1335* (2006.01)
(52) U.S. Cl. .................................. 349/8; 349/9
(58) Field of Classification Search .................. None
See application file for complete search history.

(56) References Cited

U.S. PATENT DOCUMENTS

| | | | |
|---|---|---|---|
| 6,883,918 B2 | 4/2005 | Yaniv | 353/79 |
| 7,270,457 B2 | 9/2007 | Guo et al. | 362/555 |
| 7,438,423 B2 | 10/2008 | Conner | |
| 2007/0030401 A1 | 2/2007 | Chien et al. | |
| 2008/0266470 A1* | 10/2008 | Muramoto | 349/8 |

FOREIGN PATENT DOCUMENTS

| | | |
|---|---|---|
| JP | 10-142689 | 5/1998 |
| JP | 2006309231 | 11/2006 |
| JP | 2007287885 | 11/2007 |
| TW | 200712555 | 8/2006 |
| TW | 1280429 | 5/2007 |

OTHER PUBLICATIONS

English Abstract of JP 2007-287885A, published Nov. 1, 2007, Nippon Kogaku KK (1 page).
English Abstract of JP 2006-309231A, published Nov. 9, 2006, Samsung Electronics Co Ltd (1 page).
English Abstract of TW 1280429, published May 1, 2007, Koninklijke Philips Electronics N.V. (1 page).
English Abstract of TW 200712555, published Aug. 28, 2006, 3M Innovative Properties Company (1 page).

* cited by examiner

*Primary Examiner* — Thanh-Nhan P. Nguyen

(57) ABSTRACT

An optical module is used in an electronic device to share a light source. The light source can be shared concurrently with an image projection device and a different component, such as a liquid crystal display device. Alternatively, the light source is used for providing illumination to the component only when the light source is not used by the image projection device. When the light source is used for providing illumination to the liquid crystal display device, at least part of the light beam from the light source is coupled to a back-light unit of the display device, for example. In addition to providing illumination to the liquid crystal display device, part of the light beam can also be used to provide illumination to other accessories or components, such as a keyboard of the electronic device.

17 Claims, 10 Drawing Sheets

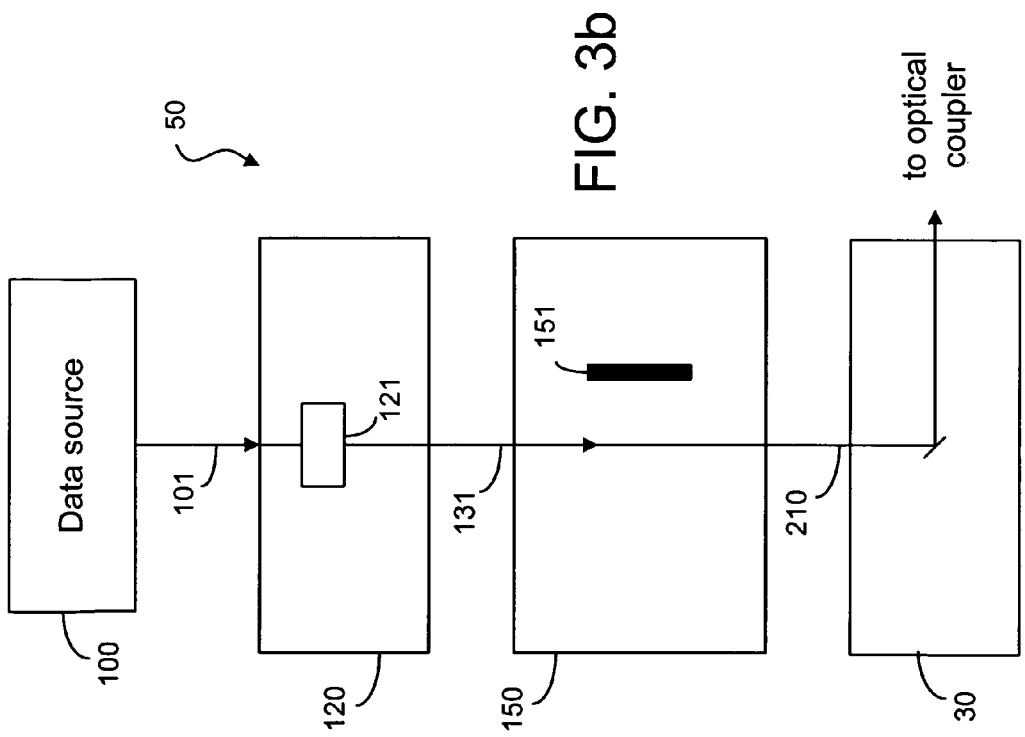
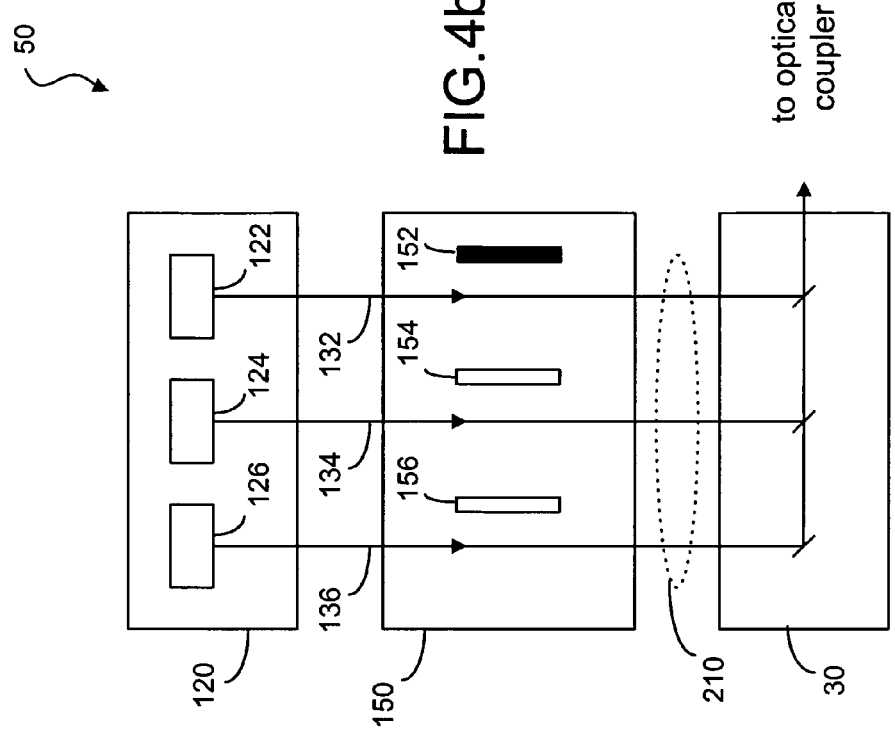

SHARED LIGHT SOURCE IN AN ELECTRONIC DEVICE

FIELD OF THE INVENTION

The present invention relates generally to a light source and, more specifically, to a back-light unit.

BACKGROUND OF THE INVENTION

An electronic device, such as a mobile phone or an MP3 player, is usually equipped with a display, such as a liquid-crystal display (LCD) panel. It is known that an LCD is a non-emissive type display and requires a light source for illumination. A transmissive LCD or a transflective LCD has a back-light unit for providing the illumination from the backside of the display panel.

SUMMARY OF THE INVENTION

An optical module is used in an electronic device to share a light source. The light source can be shared concurrently with an image projection device and a different accessory, such as a liquid crystal display device. Alternatively, the light source is used for providing illumination to the accessory only when the light source is not used by the image projection device. When the light source is used for providing illumination the liquid crystal display device, the light beam from the light source is coupled to a back-light unit of the display device, for example. In addition to providing illumination to the liquid crystal display device, part of the light beam can also be used to provide illumination to other accessories or components, such as a keyboard of the electronic device.

Thus, the first aspect of the present invention is an apparatus, which comprises:
 a display device;
 an image producing device;
 a light beam arranged to provide light to the image producing device for producing an image at a location different from the display device, wherein the image produced by the image producing device comprises a projected image, for example;
 an optical module, arranged for directing the light beam so that at least part of the light beam can also be used for providing illumination at least to the display device.

In one embodiment, the optical module is configured to split the light beam into a first part for producing the projected image and a second part for providing illumination to the display device. The light beam can be further split into a third part for providing illumination to an accessory of the apparatus.

In another embodiment of the present invention, the optical module is configured to direct the light beam for providing illumination to the display device only when the light beam is not used for producing the projected image.

In one embodiment, the light beam comprises a plurality of color beams spaced from each other, and the optical module comprises one or more beam-splitters, and/or color filters, for directing the color beams toward the image producing device along a common axis.

In another embodiment, the light beam comprises a plurality of color beams spaced from each other, and the optical module comprises one or more color filters for combining the color beams into a combined light beam, wherein a first part of the combined beam is directed toward the image producing device and at least a second part of the combined beam is directed toward the display device.

In one embodiment of the present invention, the display device comprises a liquid crystal display having a back-light unit for providing illumination to the liquid crystal display, and the apparatus further comprises an optical coupler for coupling at least part of the light beam with the back-light unit when said at least part of the light beam is arranged to provide illumination to the display device.

The second aspect of the present invention is a method for use in an electronic device comprising a display device, and a light beam arranged to provide light to an image producing device for producing an image at a location different from the display device. The method comprises directing at least part of the light beam for illuminating the display device.

In one embodiment, the image produced by the image producing device comprises a projected image formed at the location different from the display device. The method further comprises splitting the light beam into a first part and a second part, wherein the first part of the light beam is used for providing light to the image producing device, and the second part of the light beam is directed for illuminating the display device.

In another embodiment, the image produced by the image producing device comprises a projected image formed at the location different from the display device, and wherein the light beam is directed for providing illumination to the display device only when the light beam is not used for producing the projected image.

In one embodiment, the display device comprises a liquid crystal display having a back-light unit for providing illumination to the liquid crystal display, and the method further comprises coupling said at least part of the light beam with the back-light unit when at least part of the light beam is directed to provide illumination to the display device.

BRIEF DESCRIPTION OF THE DRAWINGS

FIG. 3b illustrates part of the image projection module and the optical module of FIG. 3a, operated in a different mode.

FIG. 4b illustrates part of the image projection module and the optical module of FIG. 4a, operated in a different mode.

DETAILED DESCRIPTION OF THE INVENTION

In some electronic devices, an image projection module having a light source is also used to provide a projection image. In such electronic devices, at least part of the light output from the light source can be used to illuminate a non-emissive display device.

Figure 1:
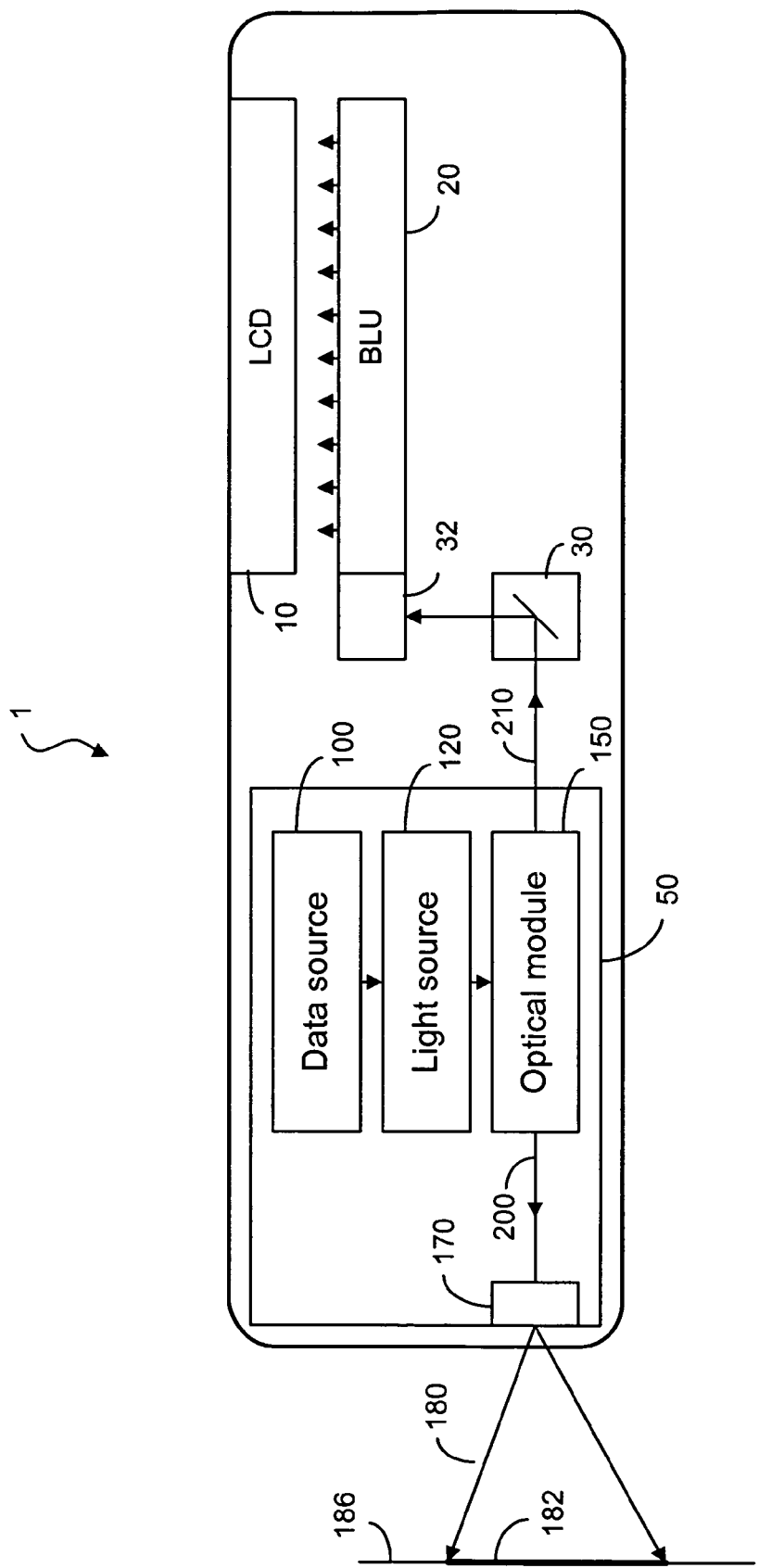
FIG. 1 illustrates an electronic device having an LCD display and a back-light unit and a different light source coupled to the back-light unit, according to various embodiments of the present invention.

As shown in FIG. 1, an electronic device 1 has a liquid-crystal display (LCD) 10 and a back-light unit (BLU) 20 for providing illumination to the LCD 10. The electronic device 1 also has an image projection module 50. The image projection module 50 has an image data source 100, a light source 120, an optical module 150 and an image producing module 170. As shown in FIG. 1, when the image projection module 50 is used to provide a projection image, the image data source 100 provides image data to the light source 120 for controlling the output of the light source 120. From the output of the light source 120, the optical module 150 provides a light beam 200 to the image producing module 170. The image producing module 170 is configured to provide an image forming beam 180 in order to produce a projected image 182 on a surface 186, for example.

According to one embodiment of the present invention, when the light beam 200 is used to produce the projected image 182, the light beam 200 is only a part of the output of the light source 120. As such, another part of the output can be used to provide another light beam 210 to illuminate the LCD 10. As shown in FIG. 1, the light beam 210 is directed by a beam director 30 toward an optical coupler 32 so that the light beam 210 becomes a part of the back-light unit 20.

Figure 2A:
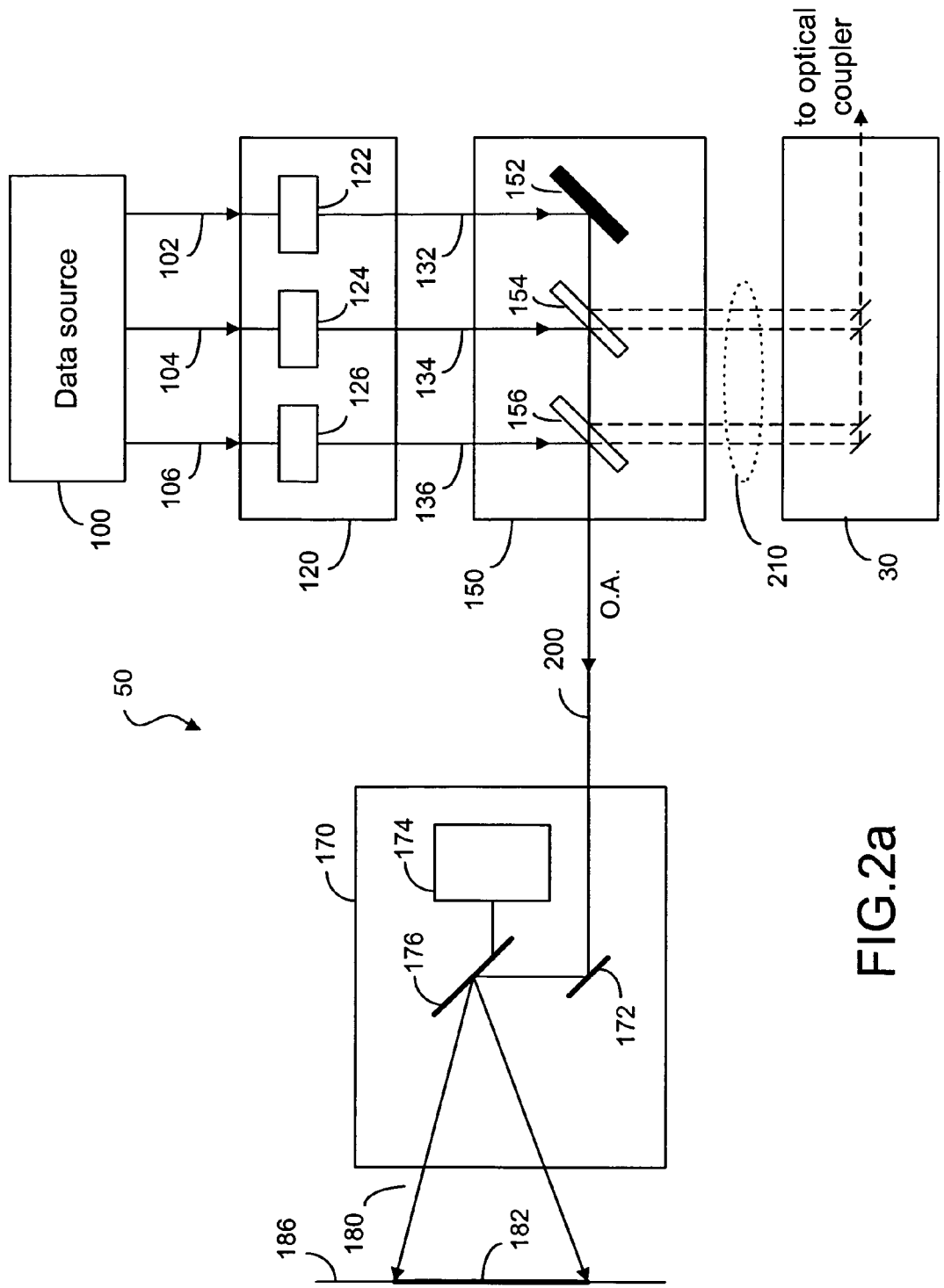
FIG. 2a illustrates an image projection module and a light beam director for directing one or more light beams from the image projection module to the back-light unit, according to one embodiment of the present invention.
Figure 2B:
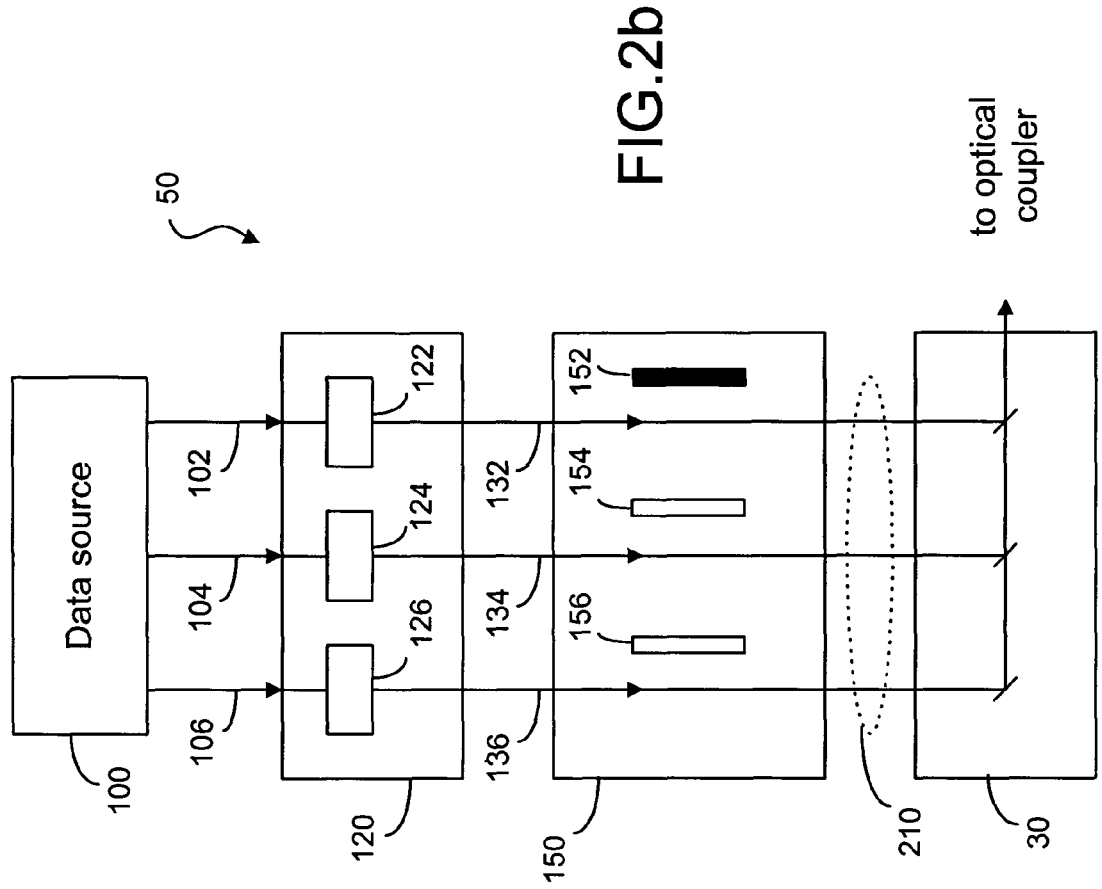
FIG. 2b illustrates part of the image projection module and the light beam director, according to another embodiment of the present invention.

An exemplary image projection module 50 is illustrated in FIGS. 2a and 2b. As shown in FIG. 2b, the light source 120 comprises three light producing devices 122, 124 and 126. For example, the light producing devices 122, 124 and 126 are lasers for producing three light beams 132, 134 and 136 of different colors, such as red, green and blue (R, G, B). The intensity of each of the light beams 132, 134 and 136 can be controlled by the color data signals 102, 104 and 106 provided by the image data source 100. As shown in FIG. 2a, the optical module 150 comprises a reflecting surface 152 for directing the light beam 132 toward the image producing module 170 along an optical axis (OA). The optical module 150 also comprises a first beam-splitter 154 and a second beam-splitter 156 to separately direct part of the light beams 134 and 136 toward the image producing module 170 along the optical axis. The directed beams from the optical module 150 form the combined light beam 200. The image producing module 170 has a reflecting surface 172 for directing the combined light beam 200 toward a scanning mirror 176. The scanning mirror 176 can be a micro-electromechanical systems (MEMS) device, for example. Under the control of a scanning driver 174, the scanning mirror 176 is configured for providing a two-dimensional scan so that the light beam 180 can form a two-dimensional projected image 182 on the surface 186. The projected image 182 is a multi-color image.

It should be noted that while one part of the light beams 134 and 136 are reflected by the beam-splitters 154 and 156 toward the image producing module 170, another part of the light beams 134 and 136 are also transmitted through the beam-splitters 154 and 156 along another direction. Moreover, the beam-splitter 154 also reflects part of the light beam directed by the reflecting surface 152, and the beam-splitter 156 also reflects part of light beams directed by both the reflecting surface 152 and the beam-splitter 154. These transmitted and reflected beams, summarily denoted by reference numeral 210, are not used for image projection. According to one embodiment of the present invention, the unused light beams 210 can be directed by the beam director 30 toward the optical coupler to be used for illuminating the LCD 10 (see FIG. 1). Thus, according to this embodiment of the present invention, the light beams provided by the light source 120 are shared by the image producing module 170 and the LCD 10. As such, the optical module 150 is operated in a light source sharing mode.

According to another embodiment of the present invention, when the image producing module 170 is not used to produce a projected image 182 (see FIGS. 1 and 2a), the reflecting surface 152 and the beam splitters 154 and 156 can be caused to move away from the light beams 132, 134 and 136, as show in FIG. 2b. The light beams 132, 134 and 136 can be used for illuminating the LCD 10, via the beam director 30 and the optical coupler. As such, the optical module 150 is operated in a back-light illumination mode.

Figure 3A:
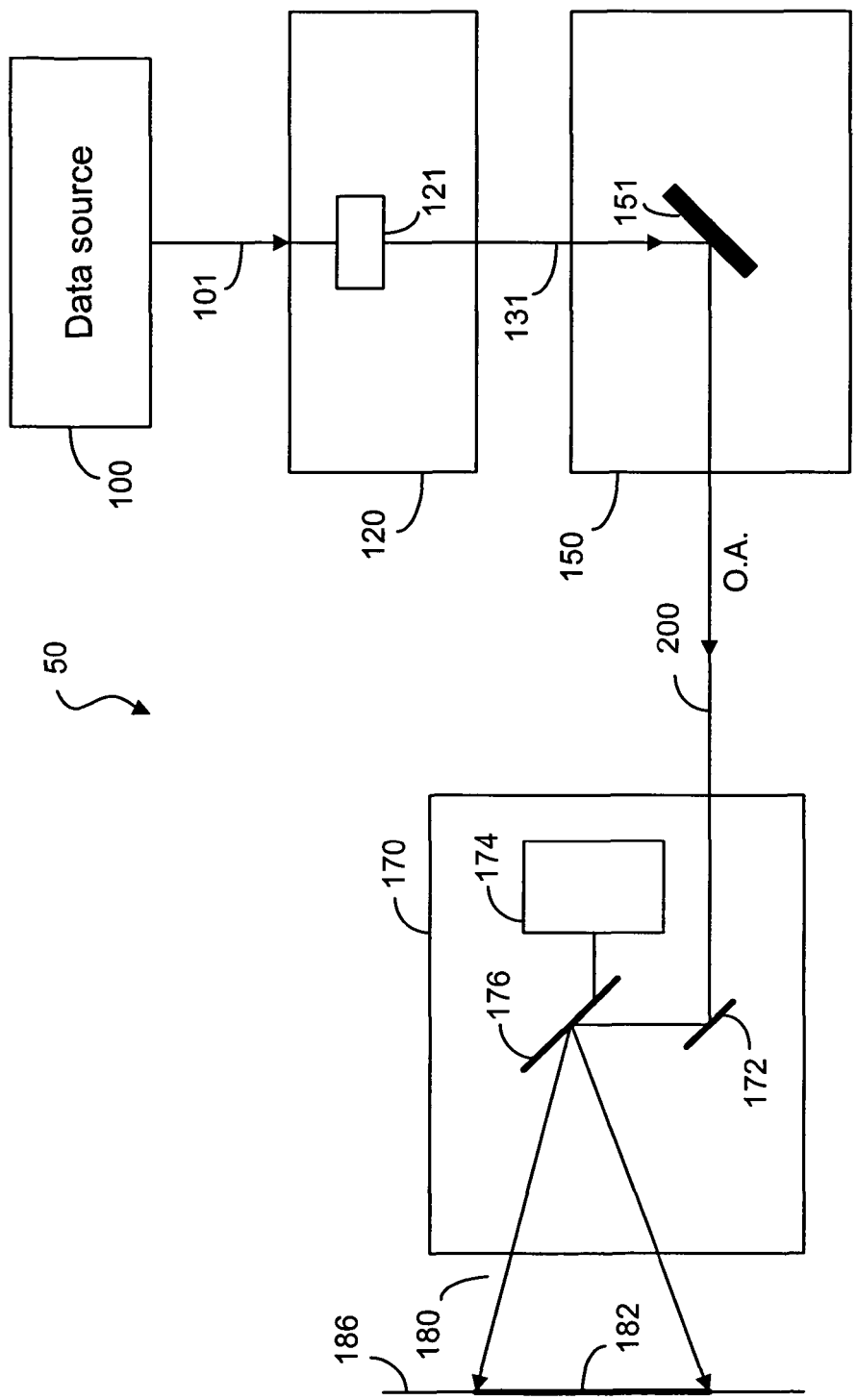
FIG. 3a illustrates an image projection module having a light source and an optical module, according to a different embodiment of the present invention.

A different image projection module 50 is illustrated in FIGS. 3a and 3b. As shown in FIG. 3b, the light source 120 comprises one light producing device 121 for producing a light beam 131. The intensity of the light beam 131 can be controlled by a data signal 101 provided by the image data source 100. The optical module 150 comprises a reflecting surface 151 for reflecting the light beam 131 toward the image producing module 170 along an optical axis (OA). The reflected light beam 200 is further reflected by the reflecting surface 172 toward a scanning mirror 176. Under the control of a scanning driver 174, the scanning mirror 176 is configured for providing a two-dimensional scan so that the light beam 180 can form a two-dimensional projected image 182 on the surface 186. The projected image 182 is a single-color image.

In this embodiment, when the light beam 131 is used for producing a projection image 182, no part of the light beam 131 can be used for illuminating the LCD 10 (see FIG. 1). As such, the optical module 150 is operated in an image projection mode.

When the image producing module 170 is not used to produce a projected image 182, the reflecting surface 151 can be caused to move away from the light beam 131, as shown in FIG. 3b. The light beam 131 can be used for illuminating the LCD 10, via the beam director 30 and the optical coupler. As such, the optical module 150 is again operated in a back-light illumination mode.

Figure 4A:
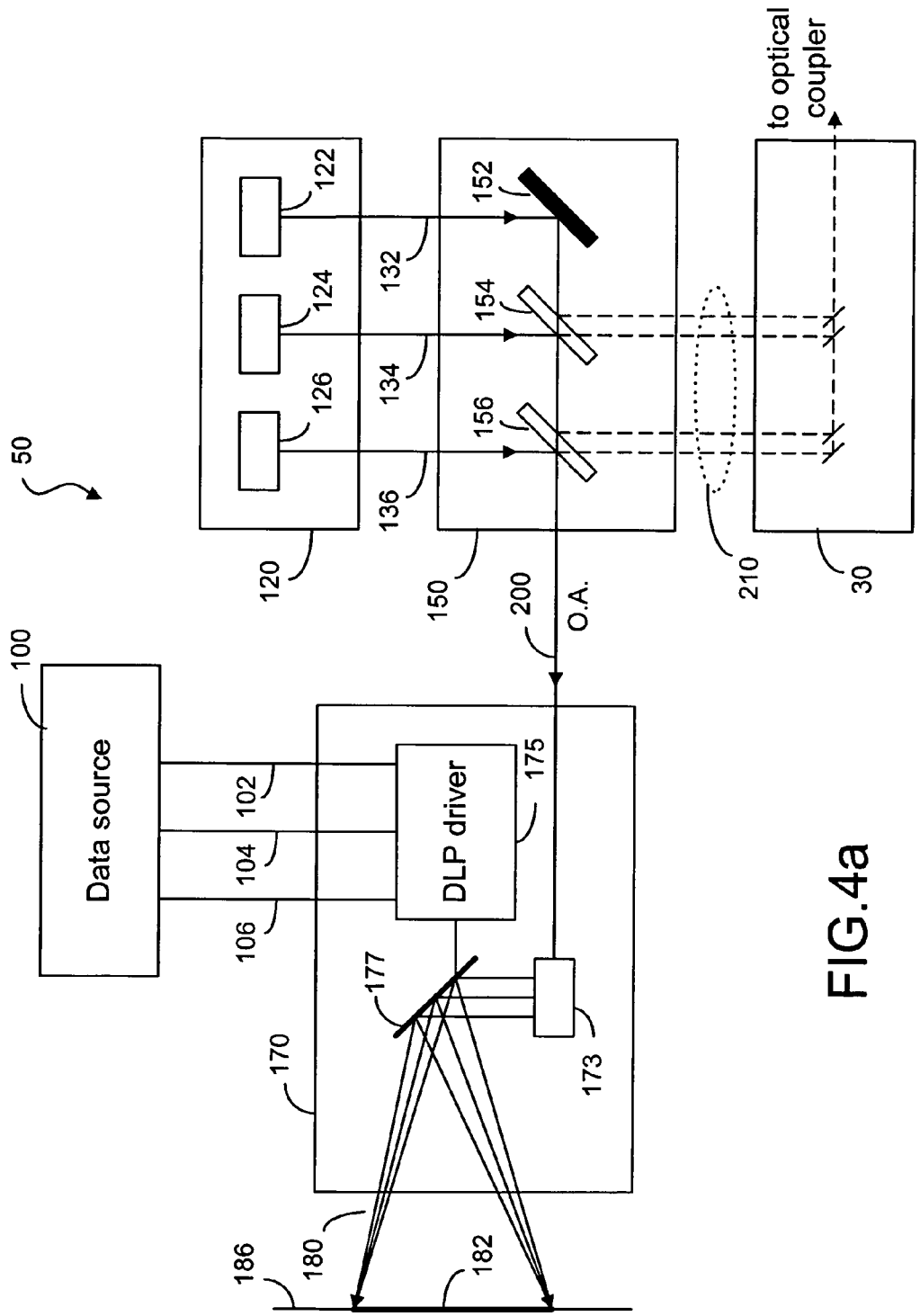
FIG. 4a illustrates an image projection module having a light source and an optical module, according to another embodiment of the present invention.

In the embodiments as illustrated in FIGS. 2a and 3a, the light beam 200 is scanned in a two-dimensional pattern by a single scanning mirror to form a two-dimensional image 182. According to a different embodiment of the present invention, the light beam 200 is expanded by a beam expander 177 and then scanned in a two-dimensional pattern by a multi-element scanning device 177, as shown in FIG. 4a. An exemplary multi-element scanning device 177 is a digital light processor (DLP), which comprises a two-dimensional array of scanning mirrors controlled by a driver 175. Each of the scanning mirrors is arranged to produce a single pixel in the projection image 182. In this embodiment, the intensity of each pixel is controlled by the color data signals 102, 104 and 106 through the driver 175. As illustrated FIG. 4a, the optical module 150 is operated in a light source sharing mode.

As with the embodiment as illustrated in FIG. 2b, when the image producing module 170 is not used to produce a projected image 182 (see FIGS. 1 and 4a), the reflecting surface 152 and the beam splitters 154 and 156 can be caused to move away from the light beams 132, 134 and 136, as show in FIG. 4b. The light beams 132, 134 and 136 can be used for illuminating the LCD 10, via the beam director 30 and the optical coupler. As such, the optical module 150 is operated in a back-light illumination mode.

Figure 5:
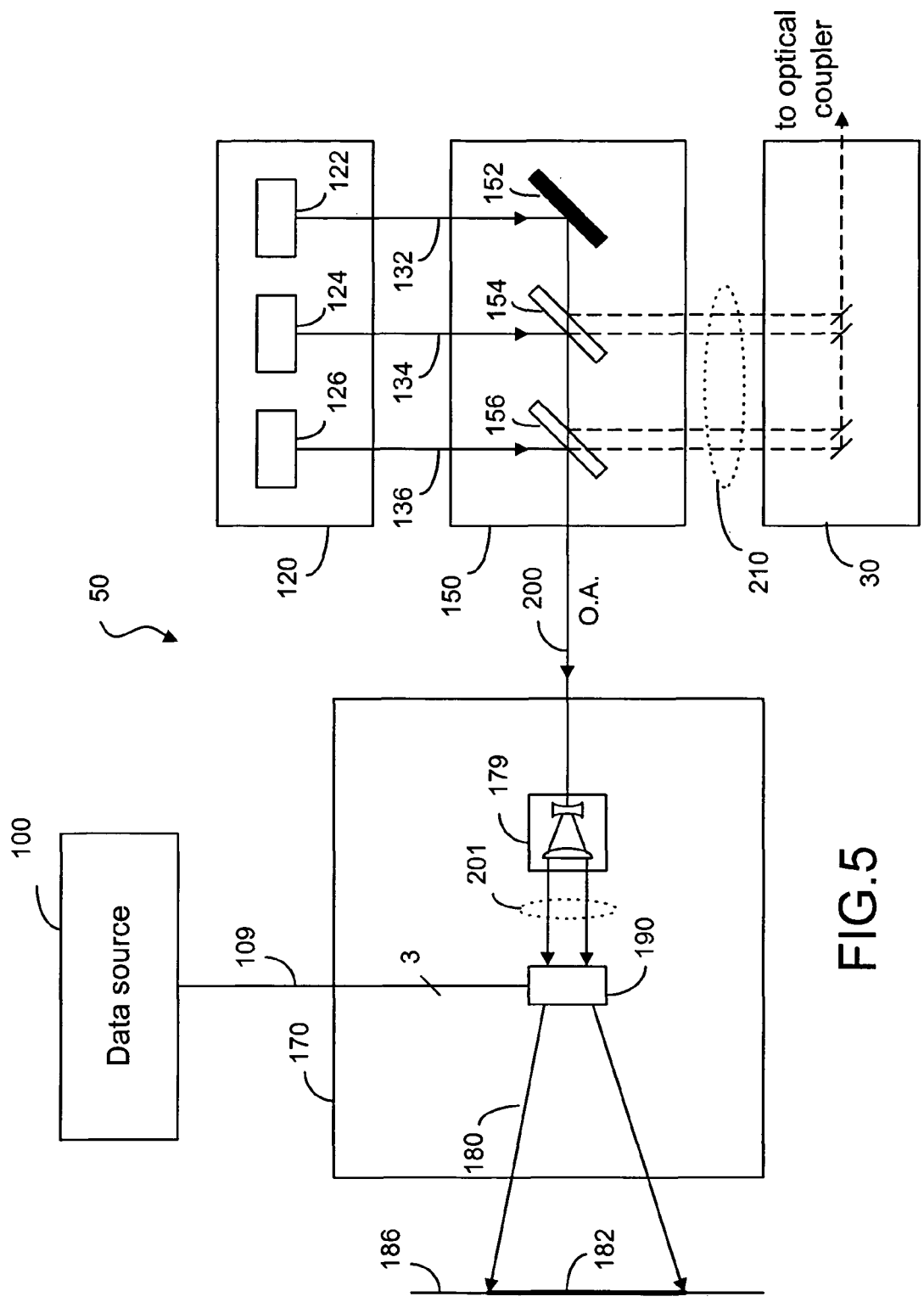
FIG. 5 illustrates a different image projection module.

A different image producing module 170 is shown in FIG. 5. Instead of using a single-scanning mirror 176, as shown in FIGS. 2*a* and 3*a*, or a multi-element scanning device 177 as illustrated in FIG. 4*a*, for producing a two-dimensional image 182, an image projection light valve or liquid crystal display 190 is used. In this embodiment, the light beam 200 is expanded into a broad beam 201 by a beam expander 179. The pixel intensity of the projected image 182 is controlled by data signals 109 provided by the image data source 100.

As with the embodiment as illustrated in FIGS. 2*a* and 4*a*, the optical module 150 in FIG. 5 is operated in a light source sharing mode.

Figure 6:
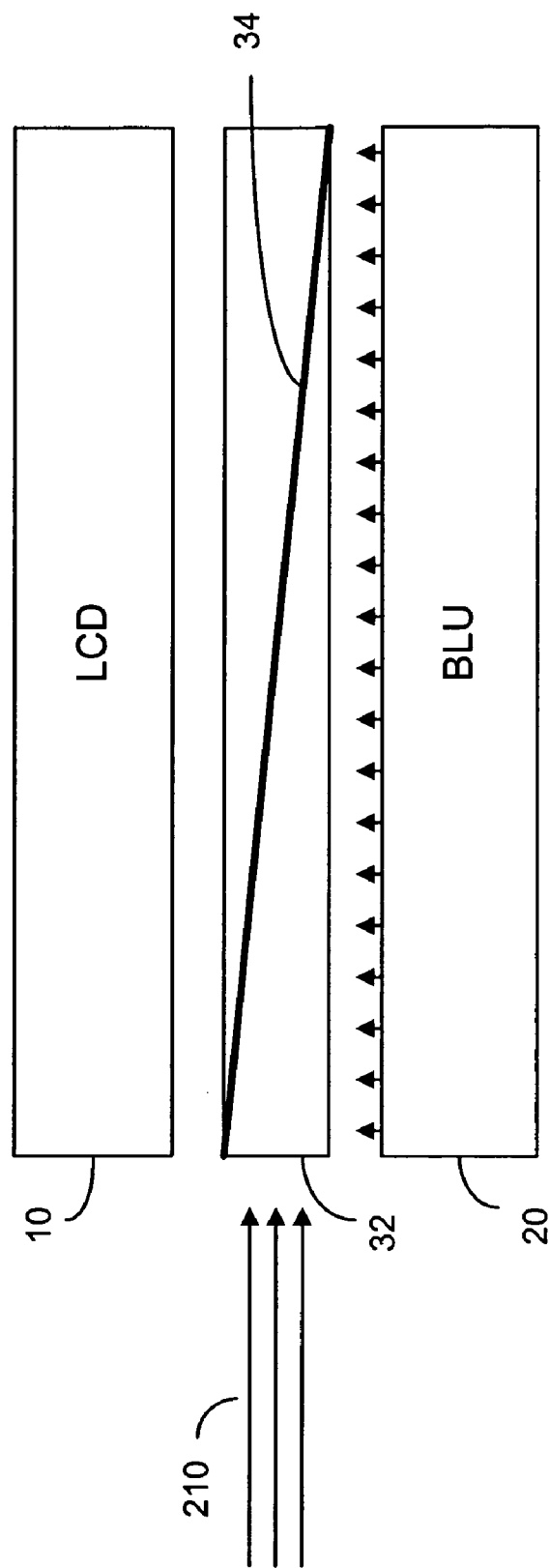
FIG. 6 illustrates an optical coupler, according to one embodiment of the present invention.

It should be noted that how the image projection is carried out is not part of the present invention. The present invention is concerned with making use of the light beams provided by the light source 120, the main purpose of which is for image projection. Through the control of the optical module 150, the light beams provided by the light source 120 can also be used for illuminating the liquid crystal display (LCD) as shown in FIG. 1. Depending on the embodiments, the light beams provided by the light source 120 can be used in a sharing mode and in a non-sharing mode. In the sharing mode, the light beams provided by the light source 120 are shared by the image producing module 170 and the back-light unit 20. In the non-sharing mode, the light beams provided by the light source 120 are used for illuminating the liquid crystal display only when the light source 120 is not used for image projection by the image producing module 170. When the light beams provided by the light source 120 are used, partially or entirely, for illuminating the liquid crystal display 120, the light beams are coupled to the back-light unit 20 by an optical coupler 32. An exemplary optical coupler 32 is shown in FIG. 6. As shown in FIG. 6, the optical coupler has a diffuse surface 34 so as to produce a diffuse light source by the light beam 210. Depending on the light intensity of the light beams 210, the light output from the back-light unit 20 can be reduced. Moreover, the optical coupler 32 with its diffuse surface 34 may be located behind the back-light unit 20, further from the LCD 10, depending on the arrangement and the structure of the back-light unit 20.

Figure 7B:
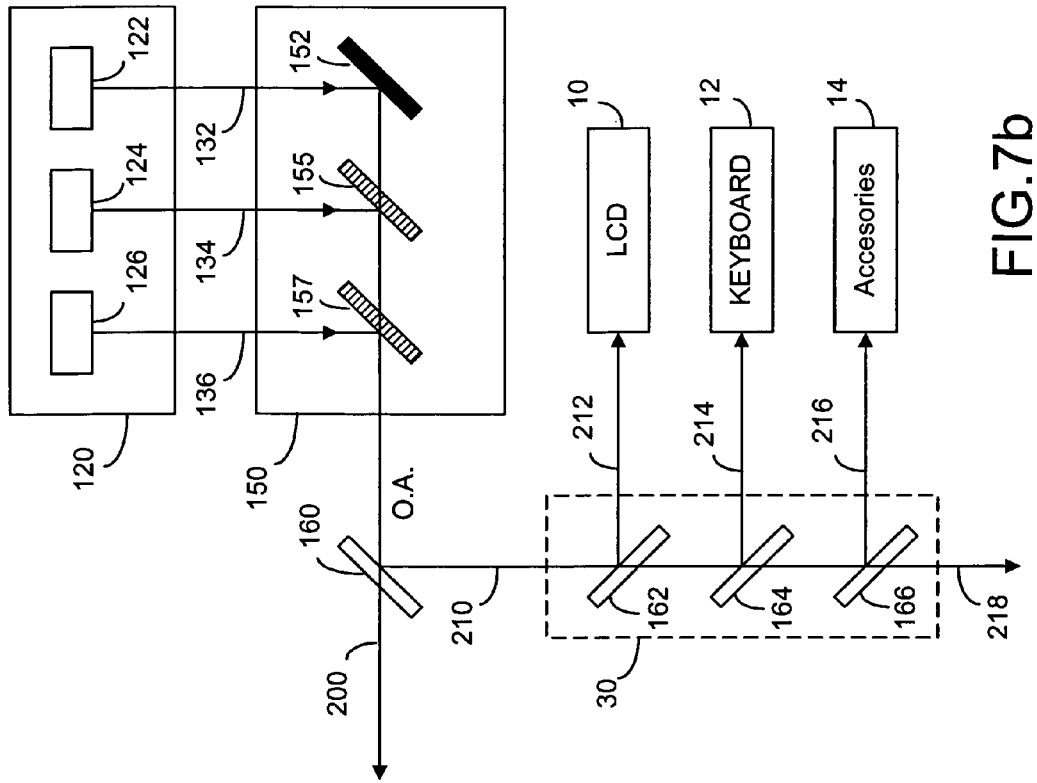
FIG. 7b illustrates a light beam sharing arrangement, according to another embodiment of the present invention.
Figure 7A:
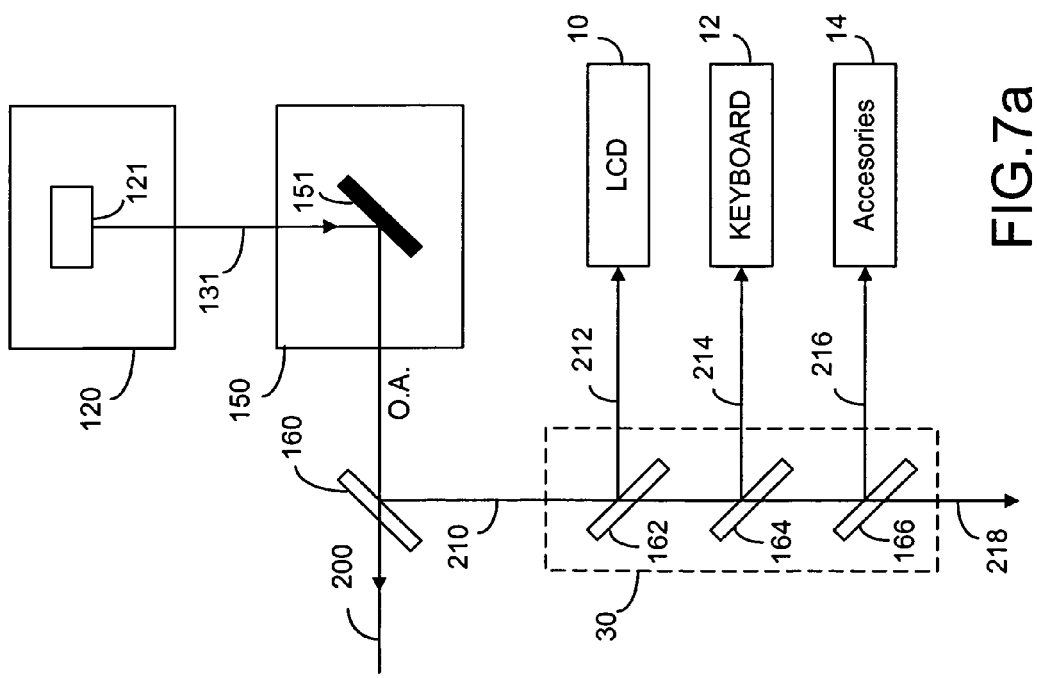
FIG. 7a illustrates a different light beam sharing arrangement, according to one embodiment of the present invention.

In other embodiments of the present invention, the light beam 210 can be further split into two or more beams to illuminate two or more components or accessories in an electronic device. As shown in FIGS. 7*a* and 7*b*, the output from the optical module 150 is split by a beam splitter 160 into light beams 200 and 210. The light beam 210 is further split by two or more beam splitters 162, 164, 166 in the beam director 30 into sub-beams 212, 214, 216 and 218. The sub-beam 212 can be used to illuminate the liquid crystal display 10 as shown in FIG. 1. If the device 1 (see FIG. 1) also comprises other accessories or components, the other sub-beams 214, 216 and 218 can be used to illuminate some or all of those accessories or components. As shown in FIGS. 7*a* and 7*b*, the sub-beam 214 is used to illuminate a keyboard 12 and the sub-beam 216 can be used to illuminate other accessories 14, such as switches or keys outside the keyboard 12. Likewise, the sub-beam 218 can be used to illuminate other parts of the device.

In FIG. 7*a*, the light source 120 and the optical module 150 can be similar to those illustrated in FIG. 3*a*, for example. In FIG. 7*b*, the light source 120 can be similar to the light source illustrated in FIGS. 2*a*, 4*a* and 5, for example. The optical module 150, as shown in FIG. 7*b*, comprises color filters 155 and 157, instead of beam splitters 154 and 156, as shown in FIGS. 2*a*, 4*a* and 5. For example, if the light beams 122, 124 and 126 in the light source 120 are red, green and blue beams, respectively, then the color filter 155 can be a low-pass (in terms of frequencies) filter that has high reflectance for green and high transmittance for red. The color filter 157 has high reflectance for blue and high transmittance for red and green. As such, the combined beam in the output of the optical module 150 will have red, green and blue components. Color filters are known in the art and not part of the present invention.

Figure 8B:
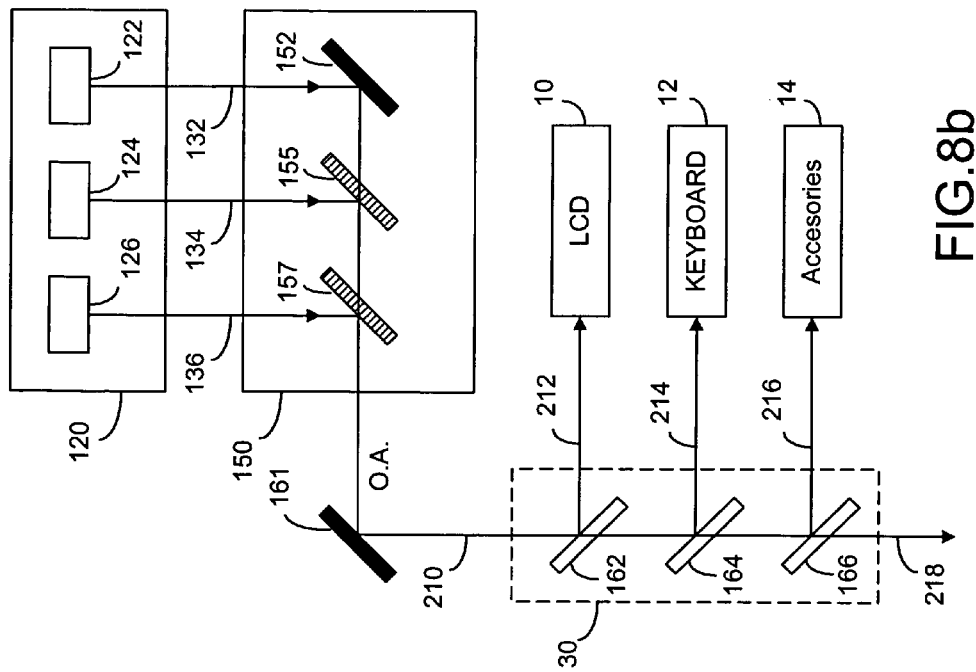
FIG. 8b illustrates a light beam arrangement, according to another embodiment of the present invention.
Figure 8A:
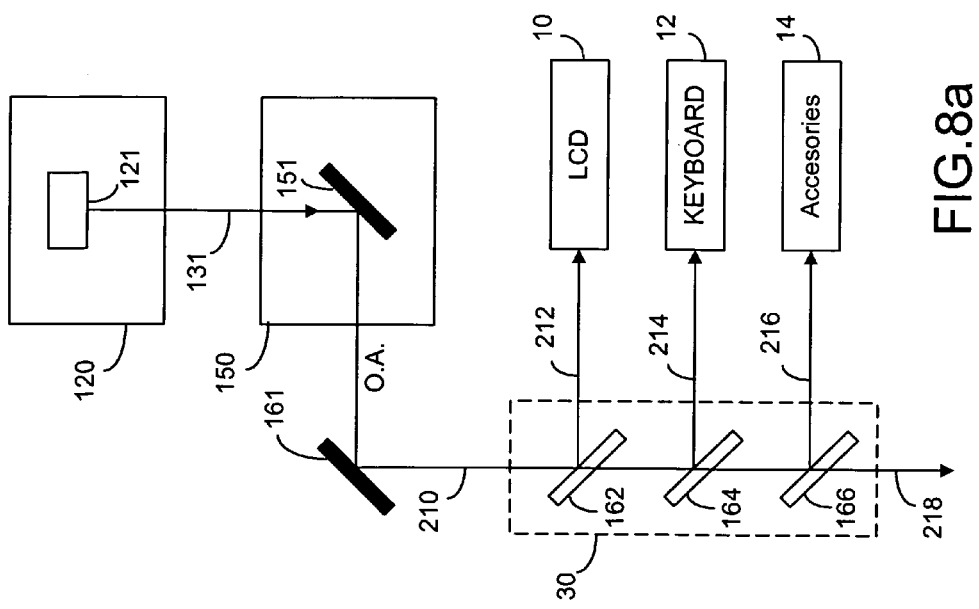
FIG. 8a illustrates a different light beam arrangement, according to one embodiment of the present invention.

In the embodiments as shown in the FIGS. 7*a* and 7*b*, the output from the optical module 150 is split into a first part 200 and a second part 210 so that the accessories 10, 12, 14 and the image producing module 170 (see FIGS. 2*a*, 3*a*, 4*a* and 5) can share the light source 120 concurrently. Alternatively, the light source 120 is used for providing illumination to the accessories only when the light source is not used by the image producing module 170. As shown in FIGS. 8*a* and 8*b*, a reflecting surface 161 is used to direct the light beam from the optical module 150 to the beam director 30.

In sum, the present invention provides a method and apparatus for making use of a light source for image projection in illuminating an image display, such as a liquid crystal display, through a back-light unit. The light beams from the light source for image projection are partially or entirely coupled to the back-light unit by an optical coupler.

In a sharing mode, part of the light beams from the light source is used for image projection and part of the light beams is used for illuminating the image display. In a non-sharing mode, the light beams are used either for image projection or for illuminating the image display. An optical module is used in an electronic device to share a light source. The light source can be shared concurrently with an image projection device and a different accessory, such as a liquid crystal display device. Alternatively, the light source is used for providing illumination to the accessory only when the light source is not used by the image projection device. When the light source is used for providing illumination the liquid crystal display device, the light beam from the light source is coupled to a back-light unit of the display device, for example. In addition to providing illumination to the liquid crystal display device, part of the light beam can also be used to provide illumination to other accessories or components, such as a keyboard of the electronic device. The apparatus, according to various embodiments of the present invention, includes a display device; an image producing device; a light beam arranged to provide light to the image producing device for producing an image at a location different from the display device, wherein the image produced by the image producing device comprises a projected image, for example; and an optical module, arranged for directing the light beam so that at least part of the light beam can also be used for providing illumination at least to the display device. The optical module can be configured to split the light beam into a first part for producing the projected image and a second part for providing illumination to the display device. The light beam can be further split into a third part for providing illumination to an accessory of the apparatus. In another embodiment of the present invention, the optical module is configured to direct the light beam for providing illumination to the display device only when the light beam is not used for producing the projected image. In various embodiments of the present invention, the light beam comprises a plurality of color beams spaced from each other, and the optical module comprises one or more beam-splitters, and/or color filters, for directing the color beams toward the image producing device along a common axis. In another embodiment, the light beam comprises a plurality of color beams spaced from each other, and the optical module comprises one or more color filters for combining the color beams into a combined light beam, wherein a first part of the combined beam is directed toward the image producing device and at least a second part of the combined beam is directed toward the display device.

The method, according to various embodiments of the present invention, is used in an electronic device including a display device, and a light beam arranged to provide light to an image producing device for producing an image at a location different from the display device. The method comprises directing at least part of the light beam for illuminating the display device. In one embodiment, the image produced by the image producing device comprises a projected image formed at the location different from the display device. The method further comprises splitting the light beam into a first part and a second part, wherein the first part of the light beam is used for providing light to the image producing device, and the second part of the light beam is directed for illuminating the display device. In another embodiment, the image produced by the image producing device comprises a projected image formed at the location different from the display device, and wherein the light beam is directed for providing illumination to the display device only when the light beam is not used for producing the projected image.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. An apparatus, comprising:
   a display device;
   an image producing device configured to produce an image at a location different from the display device;
   a light beam arranged to provide light to at least one of the image producing device and the display device; and
   an optical module, arranged for directing the light beam in a sharing mode and in a non-sharing mode, such that
   in the non-sharing mode, the light beam is used for providing illumination to one of the image producing device and the display device, and
   in the sharing mode, at least part of the light beam is used for providing illumination at least to the display device and the image producing device.

2. The apparatus according to claim 1, wherein the image produced by the image producing device comprises a projected image.

3. The apparatus according to claim 2, wherein the optical module is configured to split the light beam into a first part for producing the projected image and a second part for providing illumination to the display device.

4. The apparatus according to claim 2, wherein the light beam is further split into a third part for providing illumination to an accessory of the apparatus.

5. The apparatus according to claim 1, wherein the light beam comprises a plurality of color beams spaced from each other, and the optical module comprises one or more beam-splitters for directing the color beams toward the image producing device along a common axis.

6. The apparatus according to claim 5, wherein the image produced by the image producing device comprises a projected image, and the color beams comprising color laser beams and the image producing device comprises one or more reflecting surfaces for reflecting the light beam in a scanning pattern for producing the projected image.

7. The apparatus according to claim 1, wherein the light beam comprises a plurality of color beams spaced from each other, and the optical module comprises one or more color filters for directing the color beams toward the image producing device along a common axis.

8. The apparatus according to claim 1, wherein the light beam comprises a plurality of color beams spaced from each other, and the optical module comprises one or more color filters for combining the color beams into a combined light beam, wherein a first part of the combined beam is directed toward the image producing device and at least a second part of the combined beam is directed toward the display device.

9. The apparatus according to claim 1, wherein the display device comprises a liquid crystal display having a back-light unit for providing illumination to the liquid crystal display, said apparatus further comprising:
   an optical coupler for coupling at least part of the light beam with the back-light unit when said at least part of the light beam is arranged to provide illumination to the display device.

10. A method for use in an electronic device comprising a display device, and a light beam arranged to provide light to an image producing device for producing an image at a location different from the display device, said method comprising:
    providing an optical module for directing the light beam in a sharing mode and in non-sharing mode, such that
    in the non-sharing mode, the light beam is used for providing illumination to one of the image producing device and the display device, and
    in the sharing mode, at least part of the light beam is used for providing illumination at least to the display device and to the image producing device.

11. The method according to claim 10, wherein the electronic device further comprises an accessory different from the display device, said method further comprising:
    directing another part of the light beam for providing illumination to the accessory.

12. The method according to claim 10, wherein the image produced by the image producing device comprises a projected image formed at the location different from the display device, said method further comprising:
    splitting the light beam into a first part and a second part, wherein the first part of the light beam is used for providing light to the image producing device, and the second part of the light beam is directed for illuminating the display device.

13. The method according to claim 12, wherein the light beam comprises a plurality of color beams spaced from each other, said method further comprising:
    arranging one or more beam-splitters for directing at least part of the color beams toward the image producing device along a common axis in said splitting.

14. The method according to claim 10, wherein the display device comprises a liquid crystal display having a back-light unit for providing illumination to the liquid crystal display, said method further comprising:
    coupling said at least part of the light beam with the back-light unit when at least part of the light beam is directed to provide illumination to the display device.

15. An apparatus, comprising:
    a display device;
    an image producing device configured to produce an image at a location different from the display device;
    a light beam arranged to provide light to at least one of the image producing device and the display device; and an optical module, arranged for directing the light beam for providing illumination to one of the image producing device and the display device, wherein the image produced by the image producing device comprises a projected image and the image producing device comprises one or more reflecting surfaces for reflecting the light beam in a scanning pattern for producing the projected image.

16. The apparatus according to claim 15, wherein the image producing device further comprises a light valve device configured to receive image data from a data source for forming a smaller image on the light valve device, and a beam-expander configured to receive the light beam for providing an expanded light beam to the light valve device to produce the image based on the smaller image.

17. The apparatus according to claim 15, wherein the image producing device further comprises a beam-expander for providing an expanded light beam;

an image scanner having a two-dimensional array of reflecting mirrors, the image scanner configured to receive the expanded light beam; and a driver configured to receive image data from a data source for controlling the reflecting mirrors to produce the image.

* * * * *